(12) United States Patent  (10) Patent No.: US 8,818,294 B2
Hochwald  (45) Date of Patent: Aug. 26, 2014

(54) METHOD OF TRANSMISSION FROM MULTIPLE TRANSMIT CHAINS BASED ON A COST FUNCTION FOR ELECTROMAGNETIC RADIATION

(76) Inventor: Bertrand M. Hochwald, South Bend, IN (US)

( * ) Notice: Subject to any disclaimer, the term of this patent is extended or adjusted under 35 U.S.C. 154(b) by 0 days.

(21) Appl. No.: 13/506,250

(22) Filed: Apr. 6, 2012

(65) Prior Publication Data

US 2012/0258672 A1  Oct. 11, 2012

Related U.S. Application Data

(60) Provisional application No. 61/516,729, filed on Apr. 7, 2011.

(51) Int. Cl.
*H04B 17/00*  (2006.01)
(52) U.S. Cl.
USPC ............ 455/67.14; 455/522; 455/115.1

(58) Field of Classification Search
USPC ............ 455/522, 69, 550.1, 92, 115.1, 126, 455/127.1, 127.2, 127.4, 129, 67.11, 67.14
See application file for complete search history.

(56) References Cited

U.S. PATENT DOCUMENTS

| 2007/0135154 A1* | 6/2007 | Gautier et al. ............... 455/522 |
| 2011/0059706 A1* | 3/2011 | Harel et al. ............... 455/115.1 |
| 2012/0142291 A1* | 6/2012 | Rath et al. ............... 455/127.1 |

* cited by examiner

*Primary Examiner* — Thanh Le

(57) ABSTRACT

Embodiments of methods and apparatuses for transmission using a plurality of transmit chains based on a cost function for electromagnetic radiation are disclosed. One method is utilizing a plurality of chains, adjusting at least one of a phase or an amplitude of at least one of the transmit chains based on a cost function, wherein the cost function comprises a criterion for quality of reception at an intended receiver and a threshold for electromagnetic radiation.

28 Claims, 3 Drawing Sheets

METHOD OF TRANSMISSION FROM MULTIPLE TRANSMIT CHAINS BASED ON A COST FUNCTION FOR ELECTROMAGNETIC RADIATION

RELATED APPLICATIONS

This patent application claims the priority of provisional patent application No. 61/516,729, filed Apr. 7, 2011.

FIELD OF THE DESCRIBED EMBODIMENTS

The described embodiments relate generally to transmitting from plurality of transmit chains based on a cost function for electromagnetic radiation. More specifically, the described embodiments relate to methods for meeting these requirements by transmitting from a plurality of transmit chains, subject to a cost function that balances electromagnetic radiation thresholds against a receiver quality of reception requirement.

BACKGROUND

Many portable transmitting devices are used today in close proximity to the body, and are generally designed to meet electromagnetic radiation requirements set forth by the Federal Communications Commission (FCC) in the United States, and other similar government regulatory bodies abroad. Portable devices are getting smaller and more powerful, and are being equipped with multiple radios, many of them operating simultaneously, some of them transmitting simultaneously. Each transmitting radio exposes the user to some level of electromagnetic radiation. The acceptable radiation levels have not increased as the device power has increased. As a result, there is a need to design methods of transmission that control and reduce user exposure to electromagnetic radiation.

For example, cellular phones, especially so-called "smart-phones", are generally equipped with transmitters that operate in the 3G bands, including 800 MHz and 1900 MHz bands, the 4G bands, which can range from 700 MHz to 2700 MHz, and the WiFi band (2401-2483 MHz). These transmitters may run concurrently, depending on the mode of operation of the device.

In testing a device for radiation levels, the FCC requires the transmitting device to be put into its mode of operation that yields the greatest exposure level. With multiple radios transmitting concurrently, the radiation is additive. Hence, every added radio in a device places an additional compliance burden on each radio separately to meet radiation thresholds. The lower the radiation level of a given radio, the more likely the device as a whole will meet regulatory compliance. Generally, compliance is desired without having to sacrifice the output power of the individual radios.

SUMMARY OF THE DESCRIBED EMBODIMENTS

An embodiment includes a method of transmission utilizing a plurality of transmit chains. The method includes adjusting at least one of a phase or an amplitude of at least one of the transmit chains based on a cost function, wherein the cost function includes a criterion for quality of reception at an intended receiver, and a threshold for electromagnetic radiation. In an embodiment, the quality of reception includes minimum acceptable signal-to-noise ratio at the intended receiver. In another embodiment, the quality of reception includes data-rate to the intended receiver. In an embodiment, the electromagnetic radiation threshold is determined by the specific absorption rate (SAR). In an embodiment, the plurality of transmit chains is used to beamform to the intended receiver. In another embodiment, the plurality of transmit chains is used to transmit a plurality of streams of data. In an embodiment, the cost function models SAR as a function of the at least one of a phase or an amplitude of at least one of the transmit chains. In another embodiment, the cost function penalizes the at least one of a phase or an amplitude of at least one transmit chain that leads to high SAR.

An embodiment includes a transmitter utilizing a plurality of transmit chains and a controller for adjusting at least one of an adjustable phase or an adjustable amplitude of at least one of the transmit chains based on a cost function that includes a criterion for quality of reception and threshold for electromagnetic radiation. Another embodiment allows the controller to improve the quality of reception at the intended receiver by further adjusting the at least one of a phase or an amplitude of at least one transmit chain, while maintain electromagnetic radiation below a threshold.

Other aspects and advantages of the described embodiments will become apparent from the following detailed description, taken in conjunction with the accompanying drawings, illustrating by way of example the principles of the described embodiments.

DETAILED DESCRIPTION OF INVENTION

Figure 1:
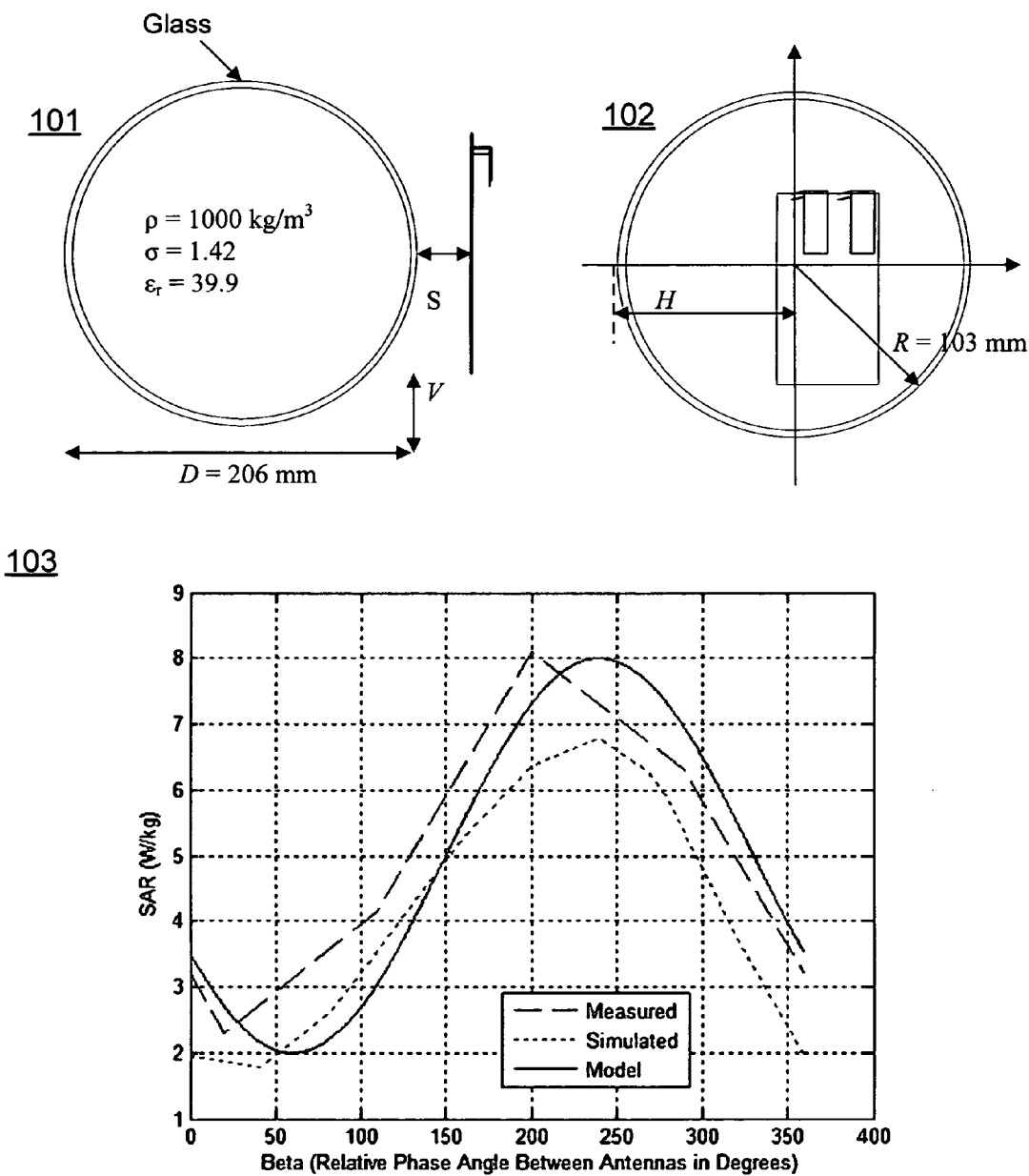
FIG. 1 shows an example of SAR as a function of relative phase of two transmit chains operating at 1900 MHz with a total transmitter power of 1 Watt.

The described embodiments provide methods for transmission from a plurality of transmit chains, wherein the transmitted signals adjust at least one of a phase or an amplitude of at least one of the transmit chains based on a cost function. The cost function comprises a criterion for quality of reception at an intended receiver and a threshold for electromagnetic radiation. One of the outcomes of an embodiment is to meet the competing requirements of low electromagnetic radiation and good quality of reception. The embodiments are operable, for example, in portable devices held near the human body where electromagnetic radiation thresholds are commonly enforced. The requirement of low electromagnetic radiation generally imposes a constraint on the maximum output transmission power (or amplitude) of the device. Conversely, the requirement of good reception at the intended receiver generally imposes a constraint on the minimum output transmission amplitude. Methods for resolving these competing constraints are described herein.

The FCC requires devices to adhere to electromagnetic radiation limits that are based on maximum permissible exposure (MPE), expressed in power per-unit area, and specific-absorption rate (SAR), expressed in power per-unit mass. The SAR measurement is considered the gold standard for regulatory compliance. A SAR measurement requires specialized mannequins, electrolytes, and robotically-controlled probes, with the device operating at full power while the probe searches for worst-case electromagnetic field measurements.

The actual radiation limits in force are a function of the device usage; occupational usage with controlled exposure is allowed higher limits (often a factor of five) than the general population, where exposure is uncontrolled. Tables 1 and 2 indicate some of the limits currently in force for the general population.

TABLE 1

MPE thresholds enforced for general population (mW/cm$^2$)

| Frequency Range (f in MHz) | Power Density (mW/cm$^2$) | Averaging Time (min) |
| --- | --- | --- |
| 300-1500 | f/1500 | 30 |
| 1500-100,000 | 1.0 | 30 |

TABLE 2

SAR thresholds enforced for general population (W/kg)

| Whole-Body | Partial-Body | Hands, Wrists, Feet, Ankles |
| --- | --- | --- |
| 0.08 | 1.6 | 4.0 |

SAR is a measure of absorption of electromagnetic radiation by human body tissue, and subsequent conversion to heat. The radiation thresholds in Table 2 represent the maximum levels that the body can safely dissipate. These values were originally designed to handle portable devices with a single transmitting radio, where testing in the vicinity of the single radiating element sufficed to determine compliance.

Radiation limits are most stringent for transmission devices that are meant to be used within 20 cm of the body. In particular, cordless and cellular phones are often held close to the head for listening and speaking. Generally, the partial-body value of SAR=1.6 W/kg threshold applies in these cases.

Multiple Transmit Chains

Multiple transmit chains, such as those found in portable devices, are traditionally used to allow multiple radios to operate simultaneously. Examples include simultaneous operation of a cellular radio in the 800 MHz band and a wireless local-area network radio in the 2400 MHz band. The radiation limitations in force such as SAR threshold values apply independently of the number of transmit chains. Testing methodologies have been developed when there is more than one chain. Generally, the SAR thresholds must be met during normal operation of the device, using the transmit chains that are normally active, and at their maximum transmit power.

It is generally understood to those practiced in the art that a transmit chain includes a baseband signal generator, phase and amplitude adjuster, modulator for radio-frequency generation, amplifier, and antenna. However, when a plurality of transmit chains are used in a single device, one or more baseband signal generator, phase or amplitude adjuster, modulator, or amplifier may be shared amongst one or more chains. A characteristic feature of a plurality of transmit chains is that a plurality of transmit signals is being transmitted by the device.

It is generally understood that a device that contains a plurality of transmit chains may also contain multiple receive chains, thereby making the device a transceiver (able to transmit and receive a plurality of signals, possibly simultaneously). Since radiation requirements generally do not apply to the receiving components of a device, the embodiments described herein generally omit the details concerning the receive chains that may accompany the transmit chains.

This invention concerns the use of multiple transmit chains operating in the same band to provide low electromagnetic radiation within the band, while maintaining a criterion for quality of reception at an intended receiver. The invention utilizes the fact that many measures of radiation such as SAR and MPE are power density measurements (Watts per kilogram or Watts per square-meter), and therefore measures the power concentrated in a given volume or area. Hence, a given amount of power transmitted from a single transmit chain (occupying a small volume) is likely to have a larger SAR or MPE than the same amount of power transmitted using a plurality of chains (occupying a larger volume) that are operating simultaneously. Factors that affect this phenomenon include the power assigned to the chains, the relative phase relationships of the chains, and the physical separation of the chains.

Example with Two Transmit Chains

A wireless transmission device in normal course of operation generally wishes to communicate with an intended receiver. Hence, the multiple transmit chains, while maintaining low electromagnetic radiation, also need to operate in a manner consistent with meeting reception quality at the intended receiver. One method to attain this outcome is to employ a controller that modulates at least one of the phases or the amplitudes of the transmit chains. The controller uses a cost function that models the radiation as a function of the amplitudes or phases.

A model of electromagnetic radiation for two transmit chains obeying a threshold may be described by the functional relation $$S(v) \leq \tau,$$

where $S(v) \geq 0$ is the non-negative measure of radiation and $v=[v_1 \ v_2]^T$ denotes a vector of radio-frequency signals as delivered by the transmit chains into the antennas. In the case where electromagnetic radiation is SAR, a threshold such as 1.6 W/kg for partial-body given in Table 2 could apply. The threshold used in practice depends on the intended user of the device (such as occupational versus general public) and intended use of the device, country of operation, and acceptable margin of safety. We denote the threshold r, with the understanding that this parameter is to be set by the device manufacturer and regulations in effect at the time of production.

An example a model of radiation appears in FIG. 1, wherein is described the measured SAR (103) as a function of the relative phase angle (labeled as beta) between two transmit chains operating at a total transmitter power of 1 Watt at 1900 MHz, using the antenna configuration shown in (102) and model of a human head (101). Although FIG. 1 presents an example of a model of radiation, it is necessarily limited to the geometry of the device, antennas, and frequencies studied. Those practiced in the art will readily be able to incorporate other models as are suitable for the devices, geometry, number of transmit chains and antennas, and frequencies being considered.

We note that electromagnetic radiation that contributes to user exposure is often a "near-field" phenomenon, where the distance between the transmit chain radiating element(s) of the device and the measurement of exposure is less than 10 wavelengths of the transmission frequency ω. This is especially true with SAR, where measurement distances of a few millimeters are common.

Let $\alpha=[\alpha_1\ \alpha_2]^T$ denote a vector of positive real-valued signal amplitudes, $\phi=[\phi_1\ \phi_2]^T$ denote a vector of phases ($-\pi$ to $+\pi$), and $P=[P_1\ P_2]^T$ denote transmitter amplifier powers (non-negative real numbers). Then we may express the transmitted signal as $$v = Re\{\sqrt{P}\odot\alpha\odot e^{j(\omega t+\varphi)}\} = Re\begin{bmatrix}\sqrt{P_1}\alpha_1 e^{j(\omega t+\varphi_1)}\\ \sqrt{P_2}\alpha_2 e^{j(\omega t+\varphi_2)}\end{bmatrix}$$

where the ⊙ notation in this equation is to be interpreted as a Hadamard (element-by-element) product. In this equation, the transmission radio-frequency is ω, time is denoted t, and $j=\sqrt{-1}$. It is common to assume that the two chains have equal power ($P_1=P_2$), but a general model allows the two powers to differ.

Although α and P have similar roles in the above equation (they are both non-negative numbers that multiply each other), it is sometimes the case that a may be varied on a transmission symbol-by-symbol basis whereas P may be varied on a longer-term basis. In general, the parameters α and φ may be varied according to a cost function that incorporates a criterion for good reception quality at the intended receiver and a threshold for electromagnetic radiation. We consider power P as having units (such as Watts) and amplitude a to be a unit-less multiplier of power. Hence, those practiced in the art can adjust either amplitude or power to achieve the same outcome. We therefore consider amplitude and power interchangeably.

Generally, electromagnetic radiation is a complicated function of v. However, it is an increasing function of amplitude. The example in FIG. 1 shows SAR as a complicated function of $\phi_2-\phi_1$, labeled as beta in (103), for a transmission power of $P_1=P_2=\frac{1}{2}$ Watt with $\alpha_1=\alpha_2=1$ on both chains.

Let the criterion of reception quality at the intended receiver be denoted by a non-negative quantity R, where higher R denotes better performance. Examples of such criteria include, but are not limited to, signal-to-noise ratio (SNR), and data-rate (bits/second). The functional dependence on the transmitted signal vector is denoted R(v), where v is the transmitted signal vector as defined above. As with the radiation function S(v), the parameters available to the controller to influence R(v) include α, φ, and P. Larger α generally leads to larger R, but the dependence of R on α and φ may be a complicated function that depends on the method of transmission.

We note that reception quality is often governed by "far-field" phenomena where the distance between the transmit chain radiating element(s) of the device and the intended receiver is usually more than 10 wavelengths of the transmission frequency co. Hence, many of the classical theories of far-field propagation and channel modeling apply to the modeling of reception quality.

For example, in the case where the method of transmission uses a single stream of data, such as beamforming, the two chains may transmit the same data symbol, but differing by a phase $\phi_2-\phi_1$ that steers the energy in a desirable direction. In this case, a natural reception quality is SNR, which is directly proportional to the received power. If we assume that $P_1=P_2=P$, then $$R(v)+|\alpha_1 e^{j\phi_1}h_1+\alpha_2 e^{j\phi_2}h_2|^2 P$$

where $h_1$ and $h_2$ are the respective channels from the two transmit chains to the intended receiver. Assuming the transmit controller knows $h_1$ and $h_2$, it may adjust $\alpha_1$, $\alpha_2$, $\phi_1$, and $\phi_2$ to obtain good quality of reception.

The cost function that adjusts at least one of a phase or an amplitude of at least one of the transmit chains is designed to balance the competing requirements of good quality of reception at the intended receiver (high R(v), such as obtained by increasing transmission amplitude) versus high electromagnetic radiation (high S(v) which may also be obtained by increasing transmission amplitude). We discuss this balance in the next section.

Transmitting with M≥2 Transmit Chains

Figure 2A:
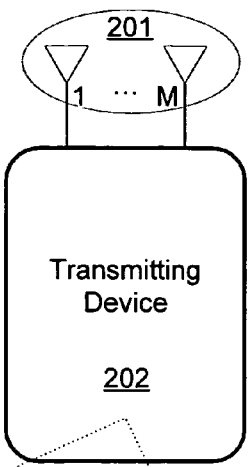
FIG. 2A shows an example of a transmitter using multiple transmit chains to adjust at least one of a phase or an amplitude of at least one of the transmit chains based on a cost function comprising a criterion of quality of reception and a threshold for electromagnetic radiation.
Figure 2B:
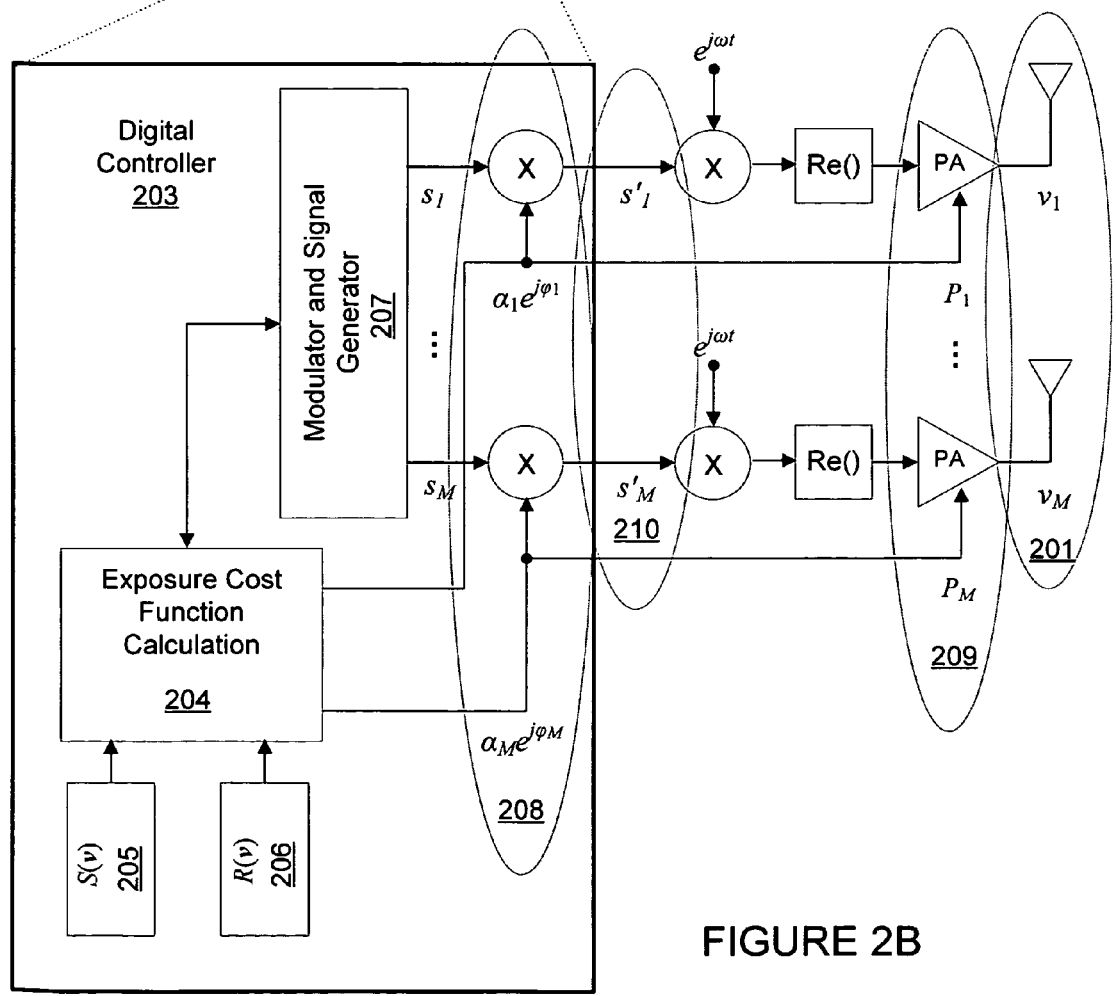
FIG. 2B shows an example of a controller adjusting at least one of a phase or an amplitude of at least one of the transmit chains using a cost function that includes quality of reception and a threshold for electromagnetic radiation.

FIGS. 2A and 2B shows an embodiment of a transmitter architecture that uses both a reception quality criterion and a radiation threshold in a cost function to influence the transmitted signal. The figure displays M transmit chains connected to corresponding antennas (201) in a device (202) that uses a controller (203) to modulate and generate the transmission signals (207) using a cost function (204). The cost function (204) has inputs that model the electromagnetic radiation S(v) (205) and the criterion for quality of reception R(v) (206), and feeds this information to the modulator (207) and the amplitudes α and phases φ (208) and the power P (209) to influence the transmission.

The vector of baseband signals $s=[s_1 \ldots s_M]^T$ is generated by the modulator (207) based on the mode of transmission, and is multiplied by a$\odot e^{j\phi}$ in (208), where $\alpha=[\alpha_1\ldots\alpha_m]^T$ and $\phi=[\phi_1\ldots\phi_M]^T$, to create the vector s' (210), which is then modulated to transmission carrier frequency ω, and amplified in (209) to create the transmitted vector v. Therefore, $$v=Re\{\sqrt{P}\odot s\odot\alpha\odot e^{j(\omega t+\phi)}\},$$

where $P=[P_1 \ldots P_M]^T$ is a vector of amplifier powers. Using this model for v, we may design cost functions that are dependent on the amplitudes α and the phases φ of the transmit chains.

A cost function comprises at least two components. One component is reception quality at the intended receiver. An example of reception quality is SNR. In the case where the transmission method involves only one data stream where $s_1=\ldots=s_m$ (such as beamforming), the SNR is proportional to $$R(v)=|v^*h|^2$$

where h is the vector of channel coefficients from the transmit chains to the intended receiver. Another example of reception quality is data-rate, which is appropriate when the transmission method involves a plurality of data streams (also known in the art as spatial multiplexing where generally $s_1\neq\ldots\neq s_m$). The data-rate is proportional to $$R(v)=\log_2 \det[E(vv^*)]$$

where E(•) is the expectation operator that indicates the average over v, as α and φ and s vary with time. FIG. 2B indicates that the modulator and signal generator (207) is coupled to the cost function (204) so that the adjustments α and φ can depend on the data symbol s.

Another component of the cost function is electromagnetic radiation, indicated by the function S(v). One way to tie the requirements on R(v) and S(v) together is to maximize the quality of reception $$\max_{\alpha,\varphi} R(v)$$

subject to $$S(v) \leq \tau.$$

These two requirements may be combined to create the cost function $$C(v, \lambda) = R(v) + \lambda[S(v) - \tau]$$

where $\lambda$ is a Lagrange multiplier, as is commonly used in constrained optimization. The controller then solves (or approximates)

$$\nabla_{\alpha, \phi, \lambda} C(v, \lambda) = 0$$

and uses the resulting values of $\alpha$ and $\phi$ for transmission.

Another example may be specified by defining the set of all transmitted signals $v$ such that electromagnetic radiation is below a threshold:

$$V_S = \{v : S(v) \leq \tau\}$$

and a cost function $$C(v) = a \cdot 1_{\{v \notin V_S\}} - b \cdot R(v)$$

where $1\{\cdot\}$ is an indicator function that takes on the value one when the condition in the braces is true, and zero otherwise. The quantities $a > 0$ and $b > 0$ are weighting values. In this cost function a is the cost or "penalty" for transmitting signals whose electromagnetic radiation level is not below the threshold. Similarly, b is the "reward" for increasing the quality of reception. Since the reward is subtracted from the penalty, the controller adjusts $\alpha$ and $\phi$ to make this cost function small. Larger values of a or b weight the importance of the respective term of the cost function more highly.

In another example, we may specify a minimum reception quality $R_0$ and define the set of all transmitted signals that provide quality of reception at least $R_0$, $$V_R = \{v : R(v) \geq R_0\}.$$

with corresponding cost function $$C(v) = a \cdot 1_{\{v \notin V_S\}} + b \cdot 1_{\{v \notin V_R\}}.$$

The controller again adjusts $\alpha$ and $\phi$ to make this cost function small. In so doing, the controller attempts to guarantee a minimum reception quality at the intended receiver while still meeting a radiation threshold. In this cost function, both a and b act as penalties.

The above embodiments allow all the elements of $\alpha$ and $\phi$ to be adjusted based on the cost function. In other embodiments, only at least one of a phase or an amplitude of the M phases and amplitudes are adjusted based on the cost function. In other embodiments, the vector P is also adjusted as a proxy for amplitude, with a possibly different time-scale than $\alpha$ and $\phi$, which may be done on a symbol-by-symbol basis.

Figure 3:
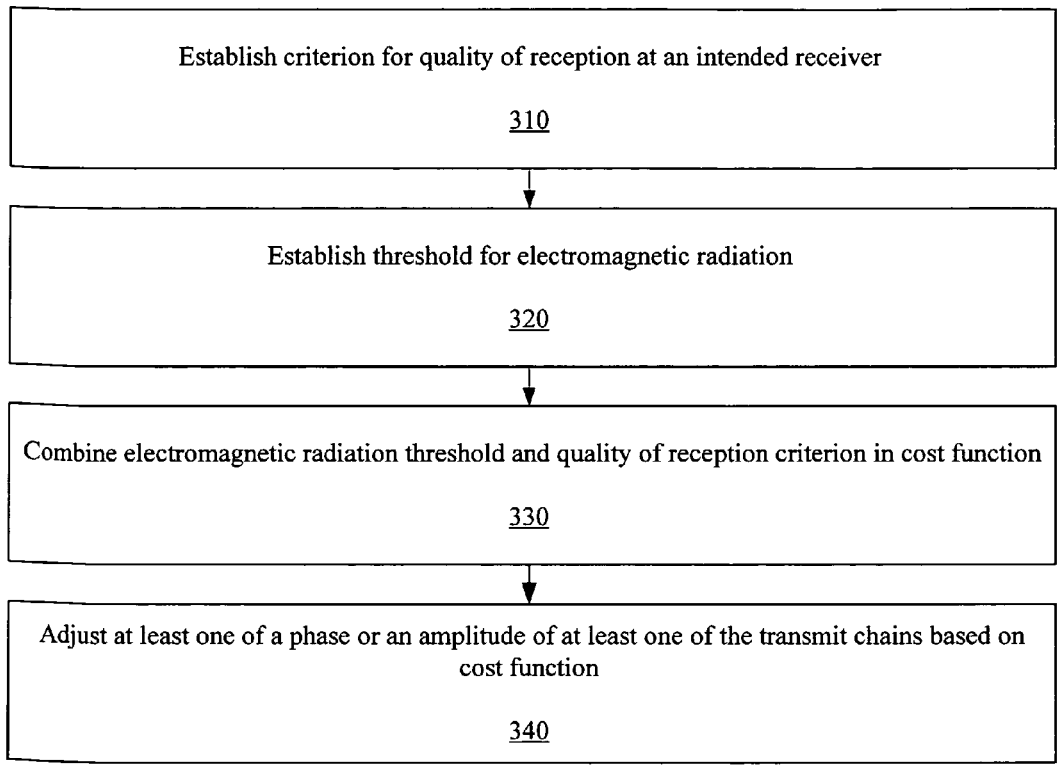
FIG. 3 is a flow chart that includes steps of transmitting from multiple chains based on a cost function for electromagnetic radiation, according to an embodiment.

FIG. 3 is a flow chart that includes steps of transmitting from a plurality of transmit chains, according to an embodiment. A first step (310) includes establishing a criterion of reception at an intended receiver. A second step (320) includes establishing a threshold for electromagnetic radiation. A third step (330) includes combining the threshold and quality of reception criterion in a cost function. A fourth step (340) includes adjusting at least one of a phase or an amplitude of at least one of the transmit chains based on the cost function. For an embodiment, the reception quality includes data-rate to the intended receiver. For an embodiment, the reception quality includes signal-to-noise ratio at the intended receiver. For an embodiment, the plurality of transmit chains are used to beamform to the intended receiver. For another embodiment, the plurality of transmit chains are used to transmit a plurality of streams of data.

For an embodiment, the electromagnetic radiation includes specific absorption rate (SAR). For another embodiment, the electromagnetic radiation includes maximum permissible exposure (MPE). For an embodiment, the cost function models SAR as a function of at least one of an amplitude or a phase of at least one of the transmit chains. For an embodiment, the cost function penalizes at least one of a phase or an amplitude of at least one of the plurality of transmit chains that least to high SAR. For an embodiment, the cost function models MPE as a function of at least one of an amplitude or a phase of at least one of the transmit chains.

For another embodiment, the electromagnetic radiation is near-field and the quality of reception is far-field. For an embodiment, the near-field is within 10 transmission-frequency wavelengths of the transmit chains, and the far-field is 10 or more transmission-frequency wavelengths from the transmit chains.

An embodiment includes a transmitter that utilizes a plurality of transmit chains, wherein a transmission signal of at least one transmit chain includes at least one of an adjustable phase or an adjustable amplitude, and a controller operative to adjust at least one of a phase or an amplitude of at least one of the transmit chains based on a cost function. The cost function comprises a criterion for quality of reception at an intended receiver, and a threshold for electromagnetic radiation.

In an embodiment, the controller cost function criterion of reception quality includes data-rate to the intended receiver. In another embodiment, the controller cost function criterion of reception includes SNR at the intended receiver.

Although specific embodiments have been described and illustrated, the embodiments are not to be limited to the specific forms or arrangements of parts so described and illustrated. The embodiments are limited only by the appended claims.

What is claimed:

1. A method of transmission from an electromagnetic signal transmitting device, comprising:
   utilizing a plurality of transmit chains of the electromagnetic transmitting device to transmit electromagnetic signals;
   adjusting at least one of a phase or an amplitude of at least one of the transmit chains based on a cost function, wherein the cost function comprises:
   a criterion for quality of reception at an intended receiver, wherein the intended receiver is located at least a far-field distance from the electromagnetic signal transmitting device;
   a threshold for electromagnetic radiation at a near-field distance from the electromagnetic signal transmitting device, wherein the near-field distance is greater than zero and less than the far-field distance.

2. The method of claim 1, wherein the criterion of reception quality includes data-rate to the intended receiver.

3. The method of claim 1, wherein the criterion of reception quality includes signal-to-noise ratio at the intended receiver.

4. The method of claim 1, wherein the plurality of transmit chains are used to beamform to the intended receiver.

5. The method of claim 1, wherein the plurality of transmit chains are used to transmit a plurality of streams of data to the intended receiver.

6. The method of claim 1, wherein the electromagnetic radiation includes specific absorption rate (SAR).

7. The method of claim 6, wherein the cost function models SAR as a function of the at least one of a phase or an amplitude of at least one of the plurality of transmit chains.

8. The method of claim 7, wherein the cost function penalizes the at least one of a phase or an amplitude of at least one of the plurality of transmit chains that leads to high SAR.

9. The method of claim 1, wherein the cost function rewards the at least one of a phase or an amplitude of at least one of the plurality of transmit chains that improves the quality of reception at the intended receiver.

10. The method of claim 1, wherein the electromagnetic radiation includes maximum permissible exposure (MPE).

11. The method of claim 10, wherein the cost function models MPE as a function of the at least one of a phase or an amplitude of at least one of the plurality of transmit chains.

12. The method of claim 1, wherein the electromagnetic radiation is near-field and the quality of reception requirement is far-field.

13. The method of claim 12, wherein the near-field is within 10 transmission-frequency wavelengths of the transmit chains, and the far-field is 10 or more transmission-frequency wavelengths from the transmit chains.

14. The method of claim 1, wherein the cost function improves the quality of reception at the intended receiver by further adjusting the at least one of a phase or an amplitude of at least one of the plurality of transmit chains, while maintaining electromagnetic radiation below the threshold.

15. A transmitter, comprising:
a plurality of transmit chains, wherein a transmission signal of at least one transmit chain includes at least one of an adjustable phase or an adjustable amplitude;
a controller, the controller operative to adjust at least one of a phase or an amplitude of at least one of the transmit chains based on a cost function, wherein the cost function comprises:
a criterion for quality of reception at an intended receiver, wherein the intended receiver is located at least a far-field distance from the electromagnetic signal transmitting device;
a threshold for electromagnetic radiation at a near-field distance from the electromagnetic signal transmitting device, wherein the near-field distance is greater than zero and less than the far-field distance.

16. The transmitter of claim 15, wherein the criterion of reception quality includes data-rate to the intended receiver.

17. The transmitter of claim 15, wherein the criterion of reception quality includes signal-to-noise ratio at the intended receiver.

18. The transmitter of claim 15, wherein the plurality of transmit chains are used to beamform to the intended receiver.

19. The transmitter of claim 15, wherein the plurality of transmit chains are used to transmit a plurality of streams of data to the intended receiver.

20. The transmitter of claim 15, wherein the electromagnetic radiation includes specific absorption rate (SAR).

21. The transmitter of claim 20, wherein the cost function models SAR as a function of the at least one of a phase or an amplitude of at least one of the plurality of transmit chains.

22. The transmitter of claim 21, wherein the cost function penalizes the at least one of a phase or an amplitude of at least one of the plurality of transmit chains that leads to high SAR.

23. The transmitter of claim 15, wherein the cost function rewards the at least one of a phase or an amplitude of at least one of the plurality of transmit chains that improves the quality of reception at the intended receiver.

24. The transmitter of claim 15, wherein the electromagnetic radiation includes maximum permissible exposure (MPE).

25. The transmitter of claim 24, wherein the cost function models MPE as a function of the at least one of a phase or an amplitude of at least one of the plurality of transmit chains.

26. The transmitter of claim 15, wherein the electromagnetic radiation is near-field and the quality of reception requirement is far-field.

27. The transmitter of claim 26, wherein the near-field is within 10 transmission-frequency wavelengths of the transmit chains, and the far-field is 10 or more transmission-frequency wavelengths from the transmit chains.

28. The transmitter of claim 15, wherein the cost function improves the quality of reception at the intended receiver by further adjusting the at least one of a phase or an amplitude of at least one of the plurality of transmit chains, while maintaining electromagnetic radiation below the threshold.

* * * * *